United States Patent

[11] 3,624,169

[72] Inventors Otto Fruhwirth
Burghausen-Obb;
Ludwig Schmidhammer, Burghausen-Obb;
Eduard Pichl, Burgkirchen-Obb, all of Germany
[21] Appl. No. 885,258
[22] Filed Dec. 15, 1969
[45] Patented Nov. 30, 1971
[73] Assignee Wacker-Chemie G.m.b.H.
Munich, Germany
[32] Priority Jan. 21, 1969
[33] Germany
[31] P 19 02 843.4

[54] PROCESS FOR CHLORINATING OLEFINES
7 Claims, No Drawings
[52] U.S. Cl. ........................... 260/654 H, 260/660
[51] Int. Cl. ........................... C07c 17/02, C07c 21/04
[50] Field of Search .................. 260/660, 654 H

[56] References Cited
UNITED STATES PATENTS
2,369,117 2/1945 Carter .......................... 260/654 H
2,601,322 6/1952 Reese .......................... 260/660

Primary Examiner—Leon Zitver
Assistant Examiner—Joseph A. Boska
Attorney—Donald Malcolm ABSTRACT: Process for chlorinating olefines with two to four C atoms, including butadiene, which comprises reacting chlorine with the olefine in the liquid reaction product itself, at a pressure of 0.5 to 6 atm. absolute, and at a temperature of 0° to 80° C., in the presence of a catalyst consisting of one or more ortho- and/or meta-substituted phenols having the general formula

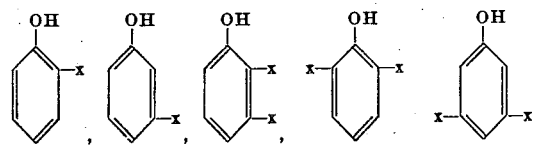

where $x$ is an alkyl radical with one to six C atoms, or a halogen, or a hydroxyl group. The catalyst solution may be circulated during the process, while the consumed olefine and chlorine are replaced.

PROCESS FOR CHLORINATING OLEFINES

The production of 1,2dichloralkanes by adding chlorine to olefines in the liquid phase is generally known. In such process gaseous olefine and gaseous or liquid chlorine are passed separately into a liquid reaction medium which preferably consists of the reaction product itself, or of an inert solvent which is stable toward chlorine. The reaction heat released during chlorination is carried off either by the reaction liquid by means of circulation through heat exchangers or by evaporation of the produced dichloralkane. In the last-mentioned method the resulting 1,2-dichloralkane is at the same time purified by distillation.

As chlorination catalysts, up to now one used principally the chlorides of iron, aluminum, antimony, chromium, copper and titanium (Canadian Pat. No. 689,991 DRP No. 640,827). With these catalysts, particularly with iron and aluminum chloride, the decomposition of the produced chlorinated hydrocarbons is possible while tarlike, carbon-rich deposits are separated, particularly when high temperatures are used.

Moreover, U.S. Pat. 3,338,982 reveals a method in which the chlorination is carried out in the presence of carboxylic acid amides. By these catalysts the reaction between olefine and chlorine is regulated selectively and no carbon-rich deposits are formed. However, the drawback of these acid amides resides in their inferior stability and their susceptability to hydrolysis, so that undesirable low-boiling byproducts are formed. Moreover, due to the high dipole momentum of the acid amides the hydrogen chloride, which because of the substitution reactions is always present in small quantities, polarizes so strongly that it has a corrosive effect on the reaction apparatus even when water is completely excluded.

It is also known that additional oxygen may be added to the olefines, which holds the undesirable sustitution reactions to a low level (U.S. Pat. No. 2,601,322).

We have now discovered a process for the addition of chlorine to olefines with two to four carbon atoms, including butadiene, in a liquid reaction product. This process is characterized by the fact that the chlorination is carried out at a pressure of 0.5 to 6 atmospheres absolute, at a temperature of 0° to 80° C. in the presence of one or several ortho-and/or meta-substituted phenols as catalyst, of the general formula

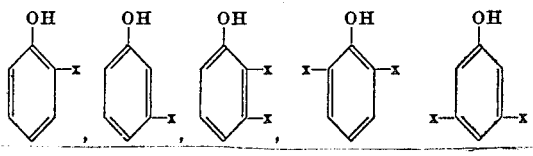

where $x$ = alkyl radicals with one to six carbon atoms and/or halogen and/or hydroxyl. If necessary, the catalyst solution is circulated while the consumed olefine and chlorine are replaced.

Examples of suitable phenols are O-cresol, pyrocatachol, pyrogallol, phloroglucine and 2sec-butylphenol, and m-cresol and resorcinol have proven to be particularly suitable. These catalysts are used in quantities of 0.01 to 2 weight percent preferably 0.05 to 0.2 weight percent, referred to the quantity of the reaction material supplied.

As olefines we use principally ethylene and propylene, but butene and butadiene can also be chlorinated by the process of the invention. The ratio between olefin and chlorine can be set stoichiometrically, but preferably one works with slight excess of olefine over chlorine, bout 1.05:1 to 1.1:1.

To the olefine used one can also add oxygen in small quantities. Olefine-oxygen volume ratios of 20,000:1 to 100,000:1 are preferably used. The chlorination is performed at temperatures from 0° to 80° C., preferably from 0° to 60° C.

An advantage of the catalysts according to the invention lies in the fact that they inhibit the formation of 1,1,2-trichloralkane at an increased scale, and the formation of ethyl chloride is suppressed completely. Thereby one clearly achieves higher yields of the desired reaction products.

Moreover, the claimed phenols are stable under the chlorination conditions, so that no decomposition products are obtained. Also, the created reaction products do not show a dark coloration, because no decomposition into carbon-rich deposits occurs, as for instance when iron chloride is use.

The phenolic catalysts of the invention retard corrosion even in the presence hydrochloric acid. Also, they are easy to handle and they can be dosaged directly into the reaction fluid. They do not present any storage problems and no difficulties during separation, because they remain in the residue of the distilling still.

Another advantage lies in the fact that the new catalysts combine in a complex manner with the iron chloride which is formed by the effect of chlorine on the iron apparatus. Thereby one prevents the iron-III-chloride from acting corrosively on the reaction products.

The process of the invention is carried out continuously most of the time. The catalyst solution obtained by the distillation is circulated after adding olefine and chlorine. The activity of the catalyst is preserved and no resinification of the reaction product occurs.

The phenolic catalysts control the chlorination of olefines selectively even at temperatures in excess of the 50° C. With this work method it is possible to utilize the reaction heat for the distilling This is achieved by relieving the reaction product, formed at higher temperature in a reactor, through a regulator valve into a distillation apparatus which is under vacuum, whereby the reaction product begins to boil and thus it can be separated. The catalyst concentrate accumulating in the distillation still is piped back into the reactor. The liquid level of the reactor is kept essentially unchanged in the known manner by a level regulator.

EXAMPLE 1

The process was performed in a glass flask with a volume of bout 5 liters. This glass reactor was equipped with a stirrer, a thermometer and a cooling jacket. After filling the reactor vessel with 1 liter of 1,2-dichlorethane, the stirring was kept up and 50 l./h. ethylene and 50 l./h. chlorine piped into the reaction medium in separate gas input pipes through glass frits on the bottom of the flask. Ethylene was present in slight excess over chlorine (about 10 p.p.m.). The temperature was kept at 30°0 C. The analytical examination of the reaction product was made gas-chromatographically. The yields were determined on the basis of the HCl and chlorine content in the reactor exhaust gas. Under the above conditions 8 tests were made. Various phenols were used as catalyst. Also, in the following tests 7 and 8 oxygen was added to the ethylene in volume proportions of 50,000:1. Each test period lasted 8 hours.

TABLE 1

| Test No. | Catalyst | Catalyst conc. weight % | Yield weight % |
|---|---|---|---|
| 1 | m-cresol | 0.1 | 100 |
| 2 | o-cresol | 0.2 | 99.9 |
| 3 | pyrocatechol | 0.2 | 99.9 |
| 4 | o-sec-butylphenol | 0.2 | 99.9 |
| 5 | resorcinol | 0.05 | 100 |
| 6 | o-cresol + m-cresol | 0.05 | 100 |
| 7 | m-cresol + oxygen | 0.1 | 100 |
| 8 | pyrocatechol + oxygen | 0.1 | 100 |

COMPARATIVE TEST

In the same apparatus and under the same conditions as in example 1 work was done using iron-III-chloride as catalyst, likewise in a glass flask with a volume of about 5 liters. Using 0.1 weight percent iron chloride as a catalyst, referred to 1,2-dichlorethane, after 4 hours of reaction in 99.0 percent yield a dark-colored dichlorethane was obtained which besides 0.11 weight percent ethylchloride contained 0.15 weight percent 1,1,2-trichlorethane.

Table 2 compares the purity of the 1,2-dichlorethane produced with iron chloride or parasustituted phenols as catalysts, with the 1,2-dichlorethane produced in accordance with example 1. The concentration data are given in p.p.m.-measures.

TABLE 2

| Test No. in Table 1 | Catalyst | Ethyl chloride | 1,1,2-tri-chlorethane |
|---|---|---|---|
| 1 | m-cresol | 0 | 10 |
| 2 | o-cresol | 0 | 50 |
| 3 | pyrocatechol | 0 | 50 |
| 4 | o-sec-butylphenol | 0 | 50 |
| 5 | resorcinol | 0 | 10 |
| Comp. Exam. iron-III-chloride | | 1100 | 1500 |
| Comp. Exam. p-tert. butylphenol | | 0 | 2200 |
| Comp/Exam. hydroquinone | | 0 | 500 |

The values of table 2 show that the catalysts of the present invention (tests 1 to 5) catalyze the addition of chlorine to ethylene selectively. It is clearly shown that when using parasubstituted phenols, the formation of byproducts is much greater, namely of the same order of magnitude as when iron-III-chloride is used.

EXAMPLE 2

In order to prove the anticorrosive effect of the phenolic catalysts of the invention, corrosion tests were made in 1,2-dichlorethane-phenol mixtures. The catalyst concentration each time was 0.20 weight percent referred to 1,2-dichlorethane and the hydrogen chloride concentration was 3 g. HCL/liter 1,2-dichlorethane. Into this 1,2-dichlorethane mixed with catalyst and hydrochloric acid, polished and weighed iron platelets (4×20 cm.) were placed. At room temperature they were exposed to 1,2-dichlorethane containing hydrogen chloride or catalyst. The measure of the iron removal was the weight loss of the iron platelets determined at certain time units by differential weighing.

Table 3 gives a comparative list of these corrosion tests with dry hydrogen chloride.

TABLE 3

| 1,2-dichlorethane + catalyst | Decrease in mg. Fe after 16 hrs. | after 64 hrs. |
|---|---|---|
| without catalyst | 0.2 | 3.9 |
| dimethylformamide (DMF) | 29.7 | 94.9 |
| o-cresol | 0.1 | 0.6 |
| resorcinol | 0.7 | 0.8 |
| pyrocatechol | 0.0 | 2.9 |

The results show that considerable corrosion arises in the presence of acid amides (DMF), while in the presence of phenols the corrosive attack is considerably lower. Even as compared with 1,2-dichlorethane alone, containing hydrogen chloride, a lower iron loss can be observed.

EXAMPLE 30

The apparatus consisted of the same reactor as is described in example 1. However, the reaction vessel was made of iron, and connected with a distilling apparatus. In the latter, the created 1,2-dichlorethane was distilled off the catalyst continuously, and the resulting catalyst concentrate was led back into the reaction. By opening a stopcock in the connecting pipeline between the runoff of the reactor and the distillation still, the 1,2-dichlorethane containing the catalyst was piped by natural incline into the distillation still. Since the reactor as well as the distilling apparatus were under the same vacuum of 500 Torr, the distillation still was heated by a heating jacket to a temperature 41° C. higher than that of the reactor, namely to 71° C., in order to bring the 1,2-dichlorethane in the still to boil. By means of an overflow pipe with subsequently cooled siphon the level of the contents of the still was kept constant.

Using 0.1 weight percent of o-cresol, referred to the 1,2-dichlorethane used, neither soot separation nor decomposition signs were visible after 40 hours of operation. The distillate consisted of 99.99 percent 1,2-dichlorethane, adulterated with about 50 p.p.m. 1,1,2-trichlorethane. No ethyl chloride was formed.

On the other hand, when using iron chloride, one could observe corrosive phenomena under separation of carbon-rich sediments, besides 0.2 weight percent of 1,1,2-trichlorethane, also 0.11 weight percent of ethyl chloride.

EXAMPLE 4

As per example 1, 50 l./h. propylene and 50 l./h. chlorine were piped into liquid 1,2-dichlorpropane, in the presence of 0.1 weight percent of m-cresol, referred to the 1,2-dichlorpropane employed. The yield amounted to 99.9 percent. Byproducts were about 50 p.p.m. of trisubstitution product. No HCl additive compound product could be detected.

EXAMPLE 5

Analogously to example 1, 50 l./h. 1,3-butadiene and 50 l./h. chlorine were brought to reaction at 0° C. in carbon tetrachloride which was compounded with 0.1 weight percent of m-cresol. After a test period of 7 hours one could determine on the basis of the HCl balance in the exhaust gas that the substitution products were below 50 p.p.m. The main products are (at the ratio of 1:1):1,4-dichlorbutene and 1,2-dichlorbutene-3.

The invention claimed is:

1. Process for chlorinating olefines with two to four carbon atoms, which comprises reacting chlorine with the olefine in the liquid reaction product itself, at a pressure of 0.5 to 6 atm. absolute, and a temperature of 0° to 80° C., in the presence of catalyst selected from the group consisting of ortho- and meta-substituted phenols having the general formula

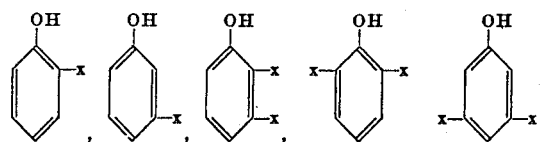

where $x$ is an alkyl radical with one to six carbon atoms, or a halogen, or a hyroxyl groups.

2. Process according to claim 1, in which the catalyst solution is continuously circulated while the consumed olefine and chlorine is replaced.

3. Process according to claim 1, in which the substituted phenol is used in quantities of 0.05 to 0.2 weight percent, referred to the quantity of reaction product.

4. Process according to claim 1, in which the reaction is performed in the presence of a substance selected from the group consisting of resorcinol and m-cresol.

5. Process according to claim 1, in which the proportion of olefine to chlorine is set stoichiometrically with a small excess of olefine over chlorine of 1.05:1 to 1.1:1

6. Process according to claim 1, in which oxygen is added to the olefine to be converted, at dosages in volume proportions of olefin to oxygen of 20,000:1 to 100,000:1.

7. Process according to claim 1 wherein the olefin is butadiene.

* * * * *